US012432627B2

(12) United States Patent
Zhu

(10) Patent No.: US 12,432,627 B2
(45) Date of Patent: Sep. 30, 2025

(54) APPARATUSES FOR PARTIALLY OFFLOADING PROTOCOL PROCESSING

(71) Applicant: APPLE INC., Cupertino, CA (US)

(72) Inventor: Jing Zhu, Portland, OR (US)

(73) Assignee: APPLE INC., Cupertino, CA (US)

(*) Notice: Subject to any disclaimer, the term of this patent is extended or adjusted under 35 U.S.C. 154(b) by 662 days.

(21) Appl. No.: 17/811,517

(22) Filed: Jul. 8, 2022

(65) Prior Publication Data
US 2022/0345953 A1 Oct. 27, 2022

Related U.S. Application Data

(62) Division of application No. 16/489,208, filed as application No. PCT/US2017/040189 on Jun. 30, 2017, now Pat. No. 11,490,296.

(51) Int. Cl.
H04W 36/00 (2009.01)
H04L 67/04 (2022.01)
H04L 67/10 (2022.01)
H04W 8/24 (2009.01)
H04W 36/08 (2009.01)

(52) U.S. Cl.
CPC ......... *H04W 36/0061* (2013.01); *H04L 67/04* (2013.01); *H04L 67/10* (2013.01); *H04W 8/24* (2013.01); *H04W 36/08* (2013.01)

(58) Field of Classification Search
CPC ... H04W 36/0061; H04W 8/24; H04W 36/08; H04W 28/0958; H04W 28/09; H04W 36/0005; H04W 36/0011; H04W 36/0055; H04W 36/22; H04L 67/04; H04L 67/10; H04L 1/1607
See application file for complete search history.

(56) References Cited

U.S. PATENT DOCUMENTS

| 7,639,715 B1 | 12/2009 | ONeil et al. |
| 10,397,829 B2* | 8/2019 | Mahmoodi ....... H04W 52/0251 |
| 2006/0166663 A1 | 7/2006 | Haehnichen et al. |
| 2014/0071971 A1* | 3/2014 | Kojima ................. H04L 47/36 370/328 |
| 2014/0156867 A1 | 6/2014 | Davari |
| 2015/0019748 A1 | 1/2015 | Gross et al. |
| 2015/0055623 A1 | 2/2015 | Li et al. |
| 2015/0109927 A1* | 4/2015 | Ozturk ............ H04W 36/0094 370/235 |

(Continued)

FOREIGN PATENT DOCUMENTS

WO    2004021150 A2    3/2004

OTHER PUBLICATIONS

U.S. Appl. No. 16/489,208, Final Office Action, Apr. 29, 2022, 19 pages.

(Continued)

*Primary Examiner* — Oussama Roudani
(74) *Attorney, Agent, or Firm* — Dorsey & Whitney LLP

(57) ABSTRACT

Apparatuses for partially offloading processing from a user equipment (UE) to a cellular Radio Access Network (RAN) node are disclosed. An apparatus for a UE includes at least one processor configured to perform Transmission Control Protocol and Internet Protocol (TCP/IP) processing and offload only a portion of the TCP/IP processing to a cellular RAN node while maintaining TCP protocols running end-to-end between the UE and a remote host.

18 Claims, 10 Drawing Sheets

(56) References Cited

U.S. PATENT DOCUMENTS

| | | |
|---|---|---|
| 2015/0163682 A1 | 6/2015 | Zarifi et al. |
| 2016/0029264 A1* | 1/2016 | Jang ................... H04L 12/18 370/331 |
| 2017/0156095 A1* | 6/2017 | Balan ............... H04W 28/0236 |
| 2017/0164237 A1 | 6/2017 | Mahmoodi et al. |
| 2017/0289059 A1 | 10/2017 | Wu et al. |
| 2017/0317946 A1 | 11/2017 | Ji et al. |
| 2018/0109590 A1* | 4/2018 | Rao .................... H04L 67/63 |
| 2019/0014529 A1* | 1/2019 | Karampatsis ....... H04W 40/248 |
| 2019/0200212 A1* | 6/2019 | Quan .................. H04W 76/10 |
| 2021/0182118 A1 | 6/2021 | Sahin |

OTHER PUBLICATIONS

U.S. Appl. No. 16/489,208, Non-Final Office Action, Nov. 19, 2021, 18 pages.
PCT/US2017/040189, International Search Report and Written Opinion, Mar. 1, 2018, 9 pages.
U.S. Appl. No. 16/489,208, Notice of Allowance, Jul. 20, 2022, 12 pages.
U.S. Appl. No. 17/811,520, Non-Final Office Action, Jun. 26, 2025, 16 pages.
U.S. Appl. No. 17/811,520, Notice of Allowance, Aug. 14, 2025, 9 pages.

* cited by examiner

APPARATUSES FOR PARTIALLY OFFLOADING PROTOCOL PROCESSING

TECHNICAL FIELD

The disclosure relates generally to partially offloading processing of Transmission Control Protocol and Internet Protocol (TCP/IP) from user equipment to a network node (e.g., to a cellular base station). In particular, the present disclosure relates to partially offloading TCP/IP processing to at least one Radio Access Network (RAN) node within a wireless communication system, and related signaling.

BACKGROUND

In recent years, demand for access to fast mobile wireless data for mobile electronic devices has fueled the development of the 3GPP LTE communication system (hereinafter "LTE system"). End users access the LTE system using mobile electronic devices (known as "user equipment" or equivalently "UE") including appropriate electronics and software to communicate according to standards set forth by 3GPP.

DETAILED DESCRIPTION OF PREFERRED EMBODIMENTS

Figure 1:
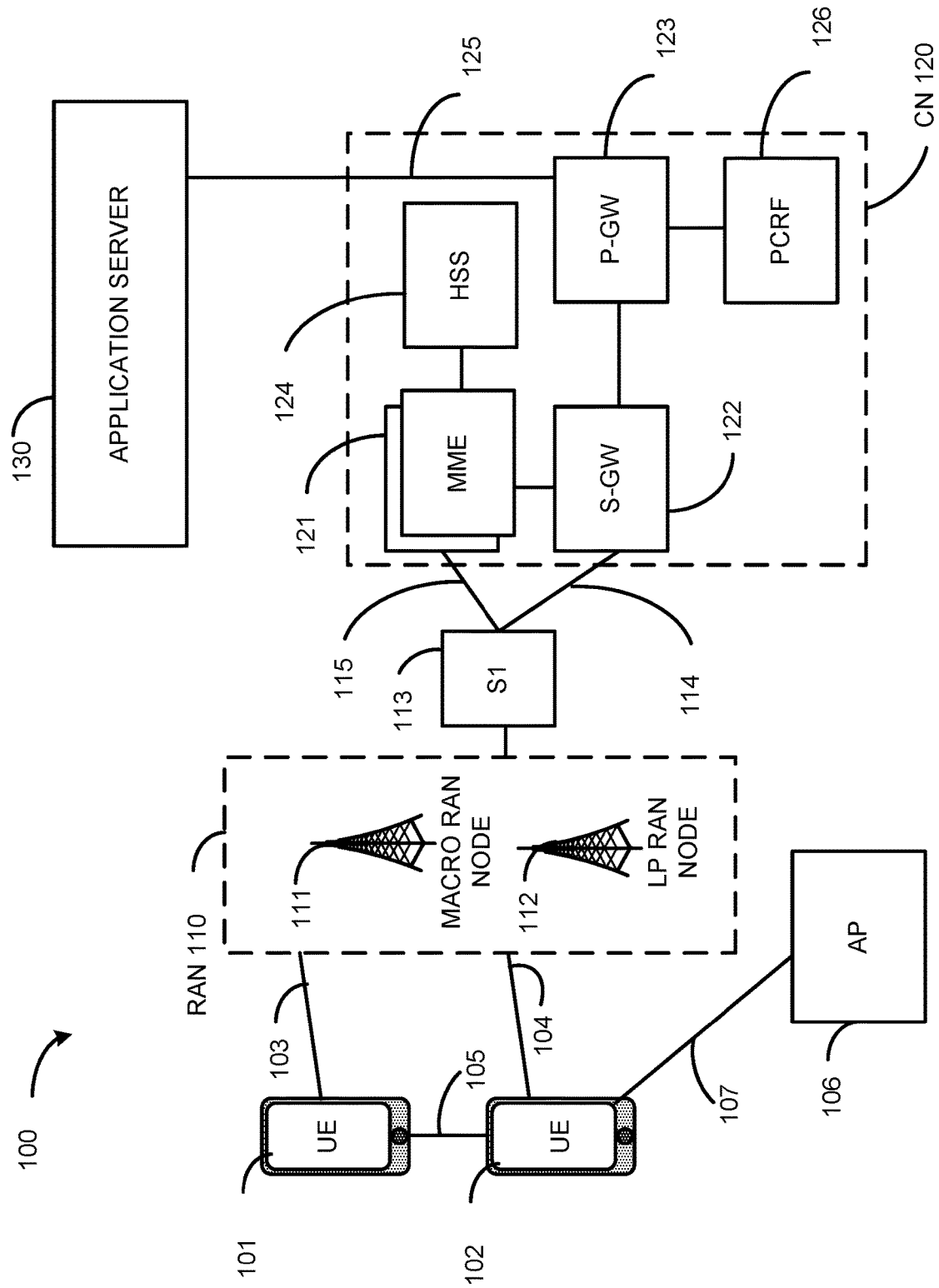
FIG. 1 is a simplified block diagram of a wireless communication system, according to some embodiments.

In the following detailed description, reference is made to the accompanying drawings, which form a part hereof, and in which are shown by way of illustration specific embodiments in which the present disclosure may be practiced. These embodiments are described in sufficient detail to enable those of ordinary skill in the art to practice the disclosure made herein. It should be understood, however, that the detailed description and the specific examples, while indicating examples of embodiments of the disclosure, are given by way of illustration only, and not by way of limitation. From the disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths, and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, a signaling diagram, or a block diagram. Although a flowchart or signaling diagram may describe operational acts as a sequential process, many of these acts can be performed in another sequence, in parallel, or substantially concurrently. In addition, the order of the acts may be rearranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

Next generation cellular radio access technology (RAT) (e.g., 5G system) is targeted to achieve a much higher peak data rate (e.g., 10 gigabits per second (Gbps)) than today's LTE system. However, it is generally accepted in the industry that 1 Hertz (Hz) of central processing unit (CPU) processing is required to send or receive 1 bit per second (bps) of TCP/IP data. For example, 5 Gbps of network traffic requires 5 gigahertz (GHz) of CPU processing. This implies that two entire cores of a 2.5 GHz multi-core processor may be used to handle the TCP/IP processing associated with 5 Gbps of TCP/IP traffic.

A TCP offload engine (TOE) may be used within network interface cards to offload processing of the entire TCP/IP stack to a network controller. TOEs may be used with high-speed network interfaces, such as gigabit Ethernet and 10 Gigabit Ethernet, where processing overhead of the network stack is significant. TOE may be used with the next generation RAT cellular network interface to reduce the CPU cycles of an application processor (AP) of a UE. However, the use of a TOE may increase the CPU cycles of the communication processor (CP) within the UE, and therefore consume substantial processing resource and power from the UE.

The UE's processing resources and power may be conserved by offloading partial TCP/IP functions (e.g., checksum, etc.) from the UE to a cellular base station (a Radio Access Node, such as an evolved NodeB (eNB), a next generation eNB (gNB), etc.), while keeping the TCP/IP protocols running end-to-end (e2e) between the UE and the remote host. In one embodiment, partial offloading may be accomplished through radio resource control (RRC) messages, which allow the UE and the base station to negotiate offloading TCP/IP functions and corresponding configuration parameters. FIG. 1 illustrates a system 100 in which this partial offload of TCP/IP functions may be implemented.

FIG. 1 illustrates an architecture of a system 100 of a network in accordance with some embodiments. The system 100 is shown to include a UE 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., a macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: an S1-U interface 114, which carries traffic data between the RAN nodes 111 and 112 and a serving gateway (S-GW) 122, and an S1-mobility management entity (MME) interface 115, which is a signaling interface between the RAN nodes 111 and 112 and MMEs 121.

In this embodiment, the CN 120 comprises the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the CN 120 (e.g., an EPC network) and external networks such as a network including an application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to the application server 130 via the IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. A Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In some embodiments, the UE 101/102 may comprise communication devices configured to communicate with at least one of the RAN nodes 111/112 through connections 103/104, respectively. The UE 101/102 may further comprise one or more processors operably coupled to the communication devices and configured to perform TCP/IP processing. The one or more processors may also be configured to offload only a portion of the TCP/IP processing (e.g., checksum) to the RAN node 111/112. The one or more processors may be further configured to maintain TCP protocols running e2e between the UE 101/102 and a remote host (e.g., the application server 130).

In accordance with some embodiments, a computer-readable storage medium of the UE 101/102 has computer-readable instructions stored thereon. The computer-readable instructions are configured to instruct one or more processors within the UE 101/102 to extract a partial TCP/IP offload capability indication from a message received from the RAN node 111/112. The partial TCP/IP offload capability indication is configured to indicate partial offload features that the RAN node 111/112 supports. The computer-readable instructions are also configured to instruct the one or more processors to generate a partial offload request indicating which of the partial TCP/IP offload features indicated by the partial TCP/IP offload capability indication are requested by the UE 101/102. The computer-readable instructions are further configured to instruct the one or more processors to decode a partial offload acknowledgment (ACK) from a message received from the RAN node 111/112. The partial offload ACK is configured to confirm that the requested TCP/IP partial offload features are in operation.

In some embodiments, a cellular base station (e.g., the RAN node 111/112) may comprise a data storage device configured to store data indicating supported partial TCP/IP offload features that are supported by the base station to enable partial offloading of TCP/IP processing from the UE 101/102. The cellular base station includes one or more processors operably coupled to the data storage device. The one or more processors are configured to generate a message to be transmitted to the UE. The message is configured to indicate the supported partial TCP/IP offload features. The processors are also configured to decode a partial TCP/IP offload request received from the UE 101/102. The partial TCP/IP offload request is configured to indicate requested TCP/IP offload features of the supported partial TCP/IP offload features that the UE 101/102 requests to activate. The processors are further configured to activate the requested TCP/IP offload features and generate an ACK message to be transmitted to the UE. The ACK message is configured to confirm that the requested TCP/IP offload features are activated.

In some embodiments, the UE 101/102 may partially offload TCP/IP processing to the RAN node 111/112. For example, the UE 101 may comprise one or more processors (e.g., an application processor, a baseband processor, etc.) configured to offload a portion of the TCP/IP processing (e.g., transmit IP checksum, transmit TCP checksum, etc.) to the RAN node 111/112. In some embodiments, the UE 101/102 may comprise processors configured to offload a portion of the TCP/IP processing to the RAN node 111/112 and/or other processors within the UE 101/102, which in turn may also be configured to offload a portion of the TCP/IP processing delegated thereto to the RAN node 111/112. For example, the UE 101 may comprise an application processor configured to offload a portion of the TCP/IP processing to a baseband processor, which is in turn configured to offload a portion of the TCP/IP processing offloaded thereto to the RAN node 111/112.

Figure 2:
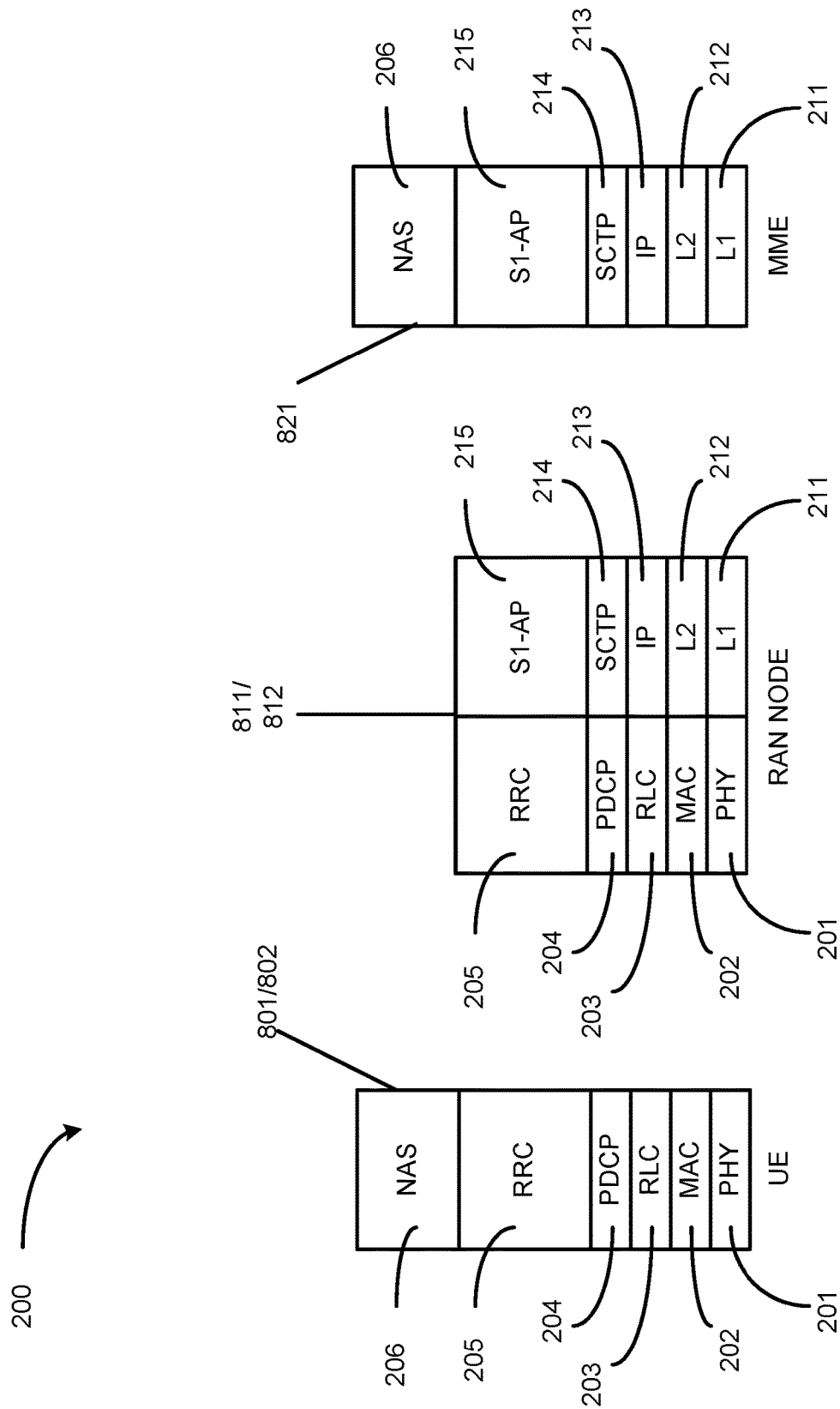
FIG. 2 is an illustration of a control plane protocol stack in accordance with some embodiments.

FIG. 2 is an illustration of a control plane protocol stack in accordance with some embodiments. In this embodiment, a control plane 200 is shown as a communications protocol stack between a UE 801/802 (similar to the UE 101/102 of FIG. 1), a RAN node 811/812 (similar to the RAN node 111/112 of FIG. 1), and an MME 821 (similar to the MME 121 of FIG. 1).

A physical (PHY) layer 201 may transmit or receive information used by a Medium Access Control (MAC) layer 202 over one or more air interfaces. The PHY layer 201 may further perform link adaptation or adaptive modulation and coding (AMC), power control, cell search (e.g., for initial synchronization and handover purposes), and other measurements used by higher layers, such as a Radio Resource Control (RRC) layer 205. The PHY layer 201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

A Radio Link Control (RLC) layer 203 may operate in a plurality of modes of operation, including: Transparent Mode (TM), Unacknowledged Mode (UM), and Acknowledged Mode (AM). The RLC layer 203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A packet data convergence protocol (PDCP) layer 204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 801/802 and the RAN node 811/812 may utilize a Uu interface (e.g., an LTE-Uu interface) to exchange control plane data via a protocol stack comprising the PHY layer 201, the MAC layer 202, the RLC layer 203, the PDCP layer 204, and the RRC layer 205.

In the embodiment shown, the non-access stratum (NAS) protocols 206 form the highest stratum of the control plane between the UE 101 and the MME 821. The NAS protocols 206 support the mobility of the UE 801/802 and the session management procedures to establish and maintain IP connectivity between the UE 101 and the P-GW 123.

The S1 Application Protocol (S1-AP) layer 215 may support the functions of the S1 interface and comprise Elementary Procedures (EPs). An EP is a unit of interaction between the RAN node 811/812 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 214 may ensure reliable delivery of signaling messages between the RAN node 811/812 and the MME 821 based, in part, on the IP protocol, supported by an IP layer 213. An L2 layer 212 and an L1 layer 211 may refer to communication links (e.g., wired or wireless) used by the RAN node and the MME 821 to exchange information.

The RAN node 811/812 and the MME 821 may utilize an S1-MME interface to exchange control plane data via a protocol stack comprising the L1 layer 211, the L2 layer 212, the IP layer 213, the SCTP layer 214, and the S1-AP layer 215.

Figure 3:
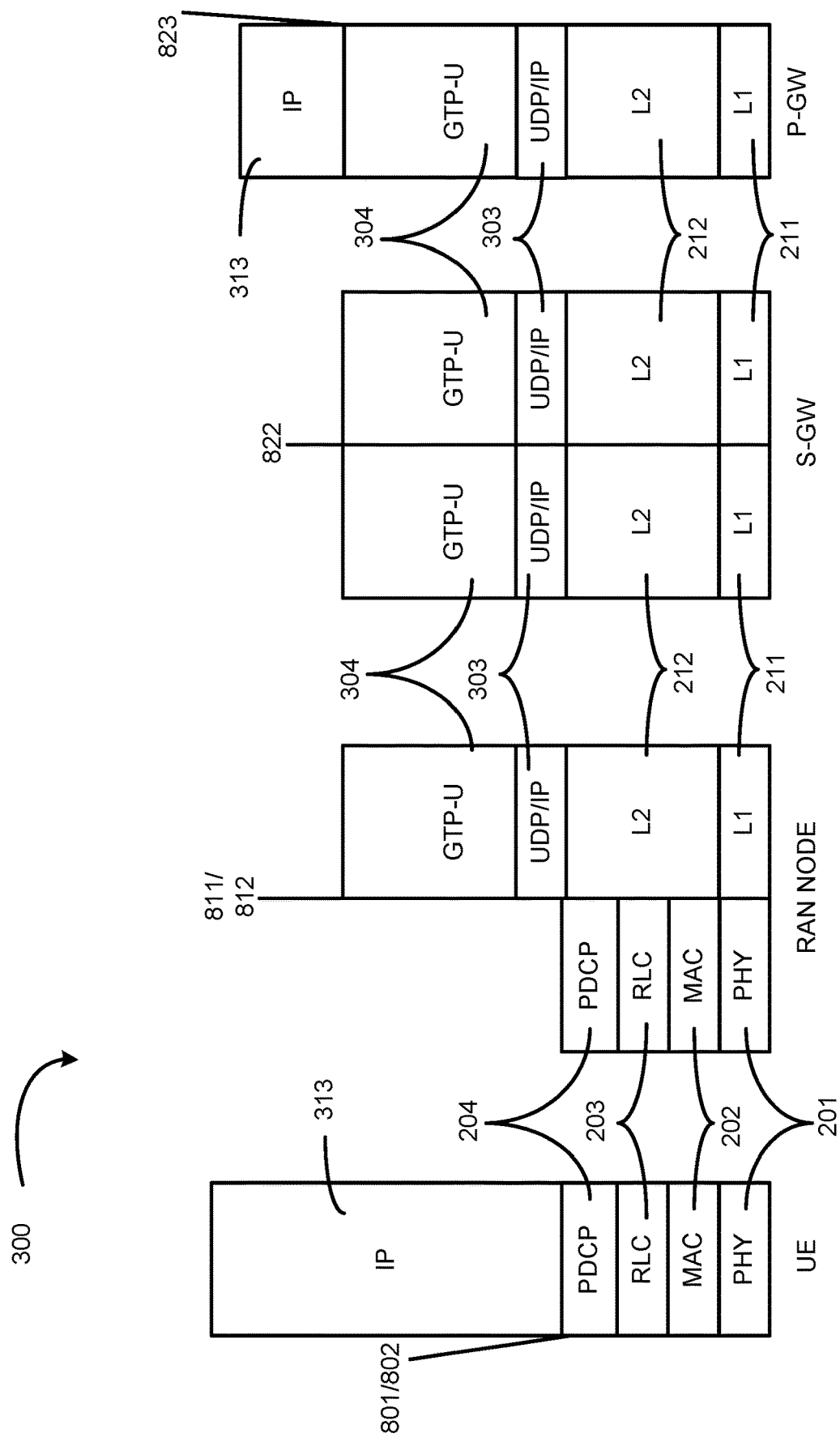
FIG. 3 is an illustration of a user plane protocol stack in accordance with some embodiments.

FIG. 3 is an illustration of a user plane protocol stack in accordance with some embodiments. In this embodiment, a user plane 300 is shown as a communications protocol stack between the UE 801/802, the RAN node 811/812, an S-GW 822 (similar to the S-GW 122 of FIG. 1), and a P-GW 823 (similar to the P-GW 123 of FIG. 1). The user plane 300 may utilize at least some of the same protocol layers as the control plane 200. For example, the UE 801/802 and the RAN node 811/812 may utilize a Uu interface (e.g., an LTE-Uu interface) to exchange user plane data via a protocol stack comprising the PHY layer 201, the MAC layer 202, the RLC layer 203, and the PDCP layer 204.

The General Packet Radio Service (GPRS) Tunneling Protocol for the user plane (GTP-U) layer 304 may be used for carrying user data within the GPRS core network and between the radio access network and the core network. The user data transported can be packets in any of IPv4, IPv6, or PPP formats, for example. The UDP and IP security (UDP/IP) layer 303 may provide checksums for data integrity, port numbers for addressing different functions at the source and destination, and encryption and authentication on the selected data flows. The RAN node 811/812 and the S-GW 822 may utilize an S1-U interface to exchange user plane data via a protocol stack comprising the L1 layer 211, the L2 layer 212, the UDP/IP layer 303, and the GTP-U layer 304. The S-GW 822 and the P-GW 823 may utilize an S5/S8a interface to exchange user plane data via a protocol stack comprising the L1 layer 211, the L2 layer 212, the UDP/IP layer 303, and the GTP-U layer 304. As discussed above with respect to FIG. 2, NAS protocols support the mobility of the UE 101 and the session management procedures to establish and maintain IP connectivity between the UE 801/802 and the P-GW 823.

Figure 4:
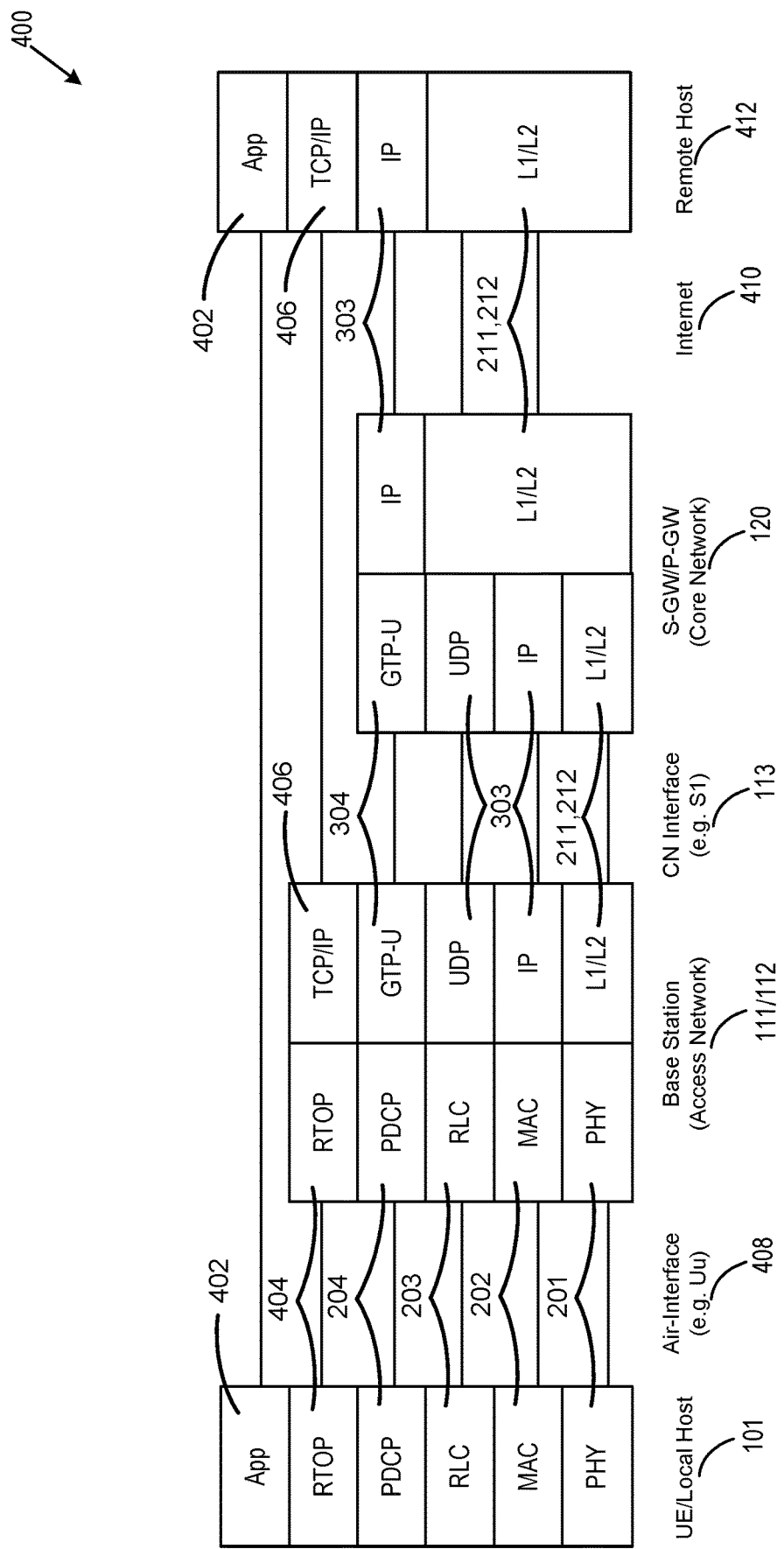
FIG. 4 is an illustration of a user plane complete TCP/IP offload protocol stack in accordance with some embodiments.

FIG. 4 is an illustration of a user plane complete offload protocol stack 400 in accordance with some embodiments. The stack 400 illustrates a RAN-based TCP/IP offload architecture along with corresponding air-interface enhancements to the offload TCP/IP stack completely out of the UE 101/102, and to a base station 111/112 (e.g., an evolved NodeB (eNB) in 4G or a next generation evolved NodeB (gNB) in 5G). The stack 400 of FIG. 4 corresponds to a RAN-based complete, not partial, TCP Offload Protocol (RTOP) to enable transferring application data directly over the cellular link without any TCP/IP processing at the UE 101/102 (FIG. 1). As shown in FIG. 4, the end-to-end connection is split into two: a TCP/IP loop 406 between base station 111/112 and remote host 412, and an RTOP loop 404 between the UE 101/102 and the base station 111/112. Disclosed herein is a framework to support partially offloading stateless TCP/IP processing from the UE 101/102 to the base station 111/112 while maintaining the rest of the TCP/IP functions at the UE 101/102 (e.g. TCP/IP encapsulation/decapsulation, TCP ACK processing, etc.).

Figure 5:
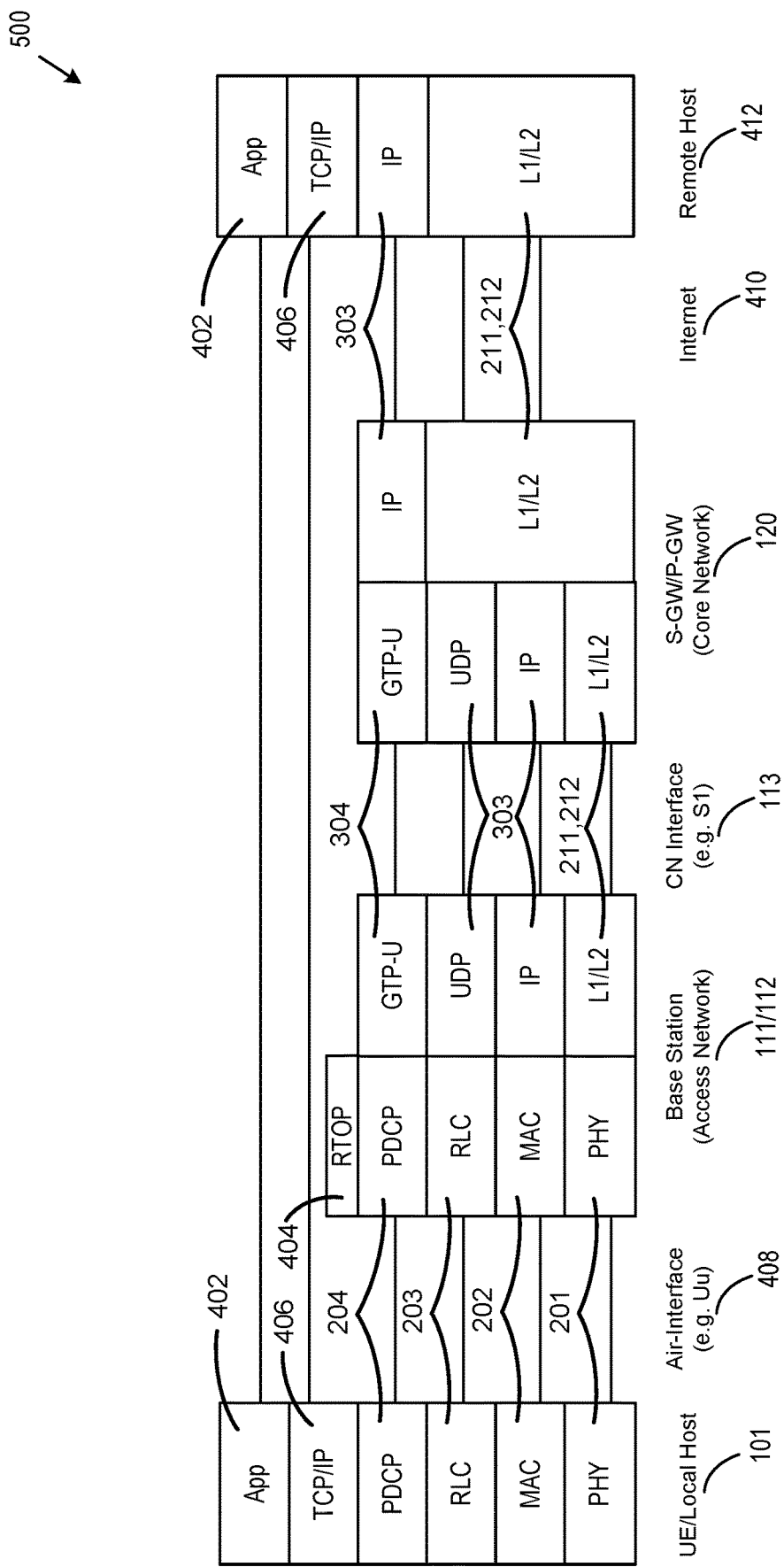
FIG. 5 is an illustration of a user plane partial TCP/IP offload protocol stack in accordance with some embodiments.

FIG. 5 is an illustration of a user plane partial TCP/IP offload protocol stack 500 in accordance with some embodiments. In some embodiments, the RTOP loop 404 may be enhanced on the base station 111/112 side to process one or more partial offload tasks. By way of non-limiting example, the partial offload tasks may include a transmit (Tx) IP (v4/v6) checksum, which may calculate and set the checksum field of the IPv4/v6 header of an out-bound (uplink) PDCP service data unit (SDU). Also by way of non-limiting example, the partial offload tasks may include a Tx TCP checksum, which may calculate and set the checksum field of the TCP header of an out-bound (uplink) PDCP SDU. As another non-limiting example, the partial offload tasks may include a Tx User Datagram Protocol (UDP) checksum, which may calculate and set the checksum field of the TCP header of an out-bound (uplink) PDCP SDU. As yet another limiting example, the partial offload tasks may include a receive (Rx) IP (v4/v6) checksum, which may validate the checksum field of the IPv4/v6 header of an in-bound (downlink) PDCP SDU and drop it if an error occurs. As a further, non-limiting example, the partial offload tasks may include an Rx TCP checksum, which may validate the checksum field of the TCP header of an in-bound (downlink) PDCP SDU and drop it if an error occurs. As yet another non-limiting example, the partial offload tasks may include an Rx UDP checksum, which may validate the checksum field of the UDP header of an in-bound (downlink) PDCP SDU, and drop it if an error occurs. As yet a further non-limiting example, the partial offload tasks may include a TCP Tx segmentation, which may segment an uplink TCP-type PDCP SDU (e.g., IP packets) larger than the Maximum Transmission Unit (MTU) size into smaller PDCP SDUs, the size of which is no more than the MTU size. As yet another non-limiting example, the partial offload tasks may include a TCP Rx concatenation, which may combine multiple downlink TCP PDCP SDUs (IP packets) of a TCP flow into a big TCP PDCP SDU. As another non-limiting example, the partial offload tasks may include a TCP ACK reconstruction, which may generate a TCP ACK and send it back on the reverse path so that UE 101/102 can drop (uplink) TCP ACKs. It should be noted that both Tx segmentation and Rx concatenation are performed separately for individual TCP flow.

Figure 6:
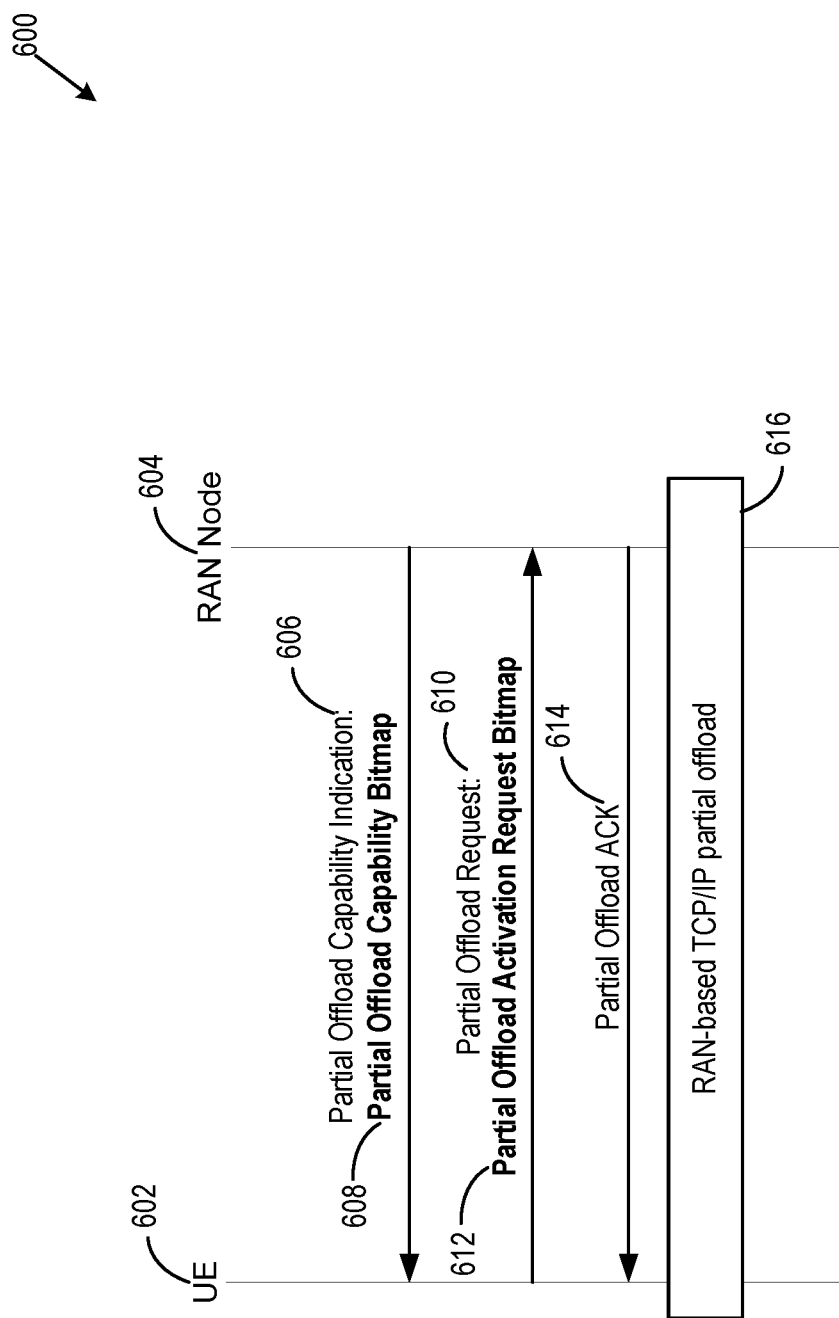
FIG. 6 is simplified signal flow diagram illustrating signaling for a TCP/IP partial offload in accordance with some embodiments.

FIG. 6 is a simplified signal flow diagram illustrating signaling 600 for a TCP/IP partial offload in accordance with some embodiments. In some embodiments, partial offloading 616 may be accomplished by introducing enhanced RRC signaling as a new information element in an existing RRC message, which allows the UE 602 and the base station 604 (shown as RAN node 604) to negotiate offloading TCP/IP functions and corresponding configuration parameters. In another embodiment, partial offloading 616 may be accomplished by introducing enhanced RRC signaling as a new RRC message, which allows the UE 602 and the RAN node (e.g., base station) 604 to negotiate offloading TCP/IP functions and corresponding configuration parameters.

The enhanced RRC signaling 600 for a TCP/IP partial offload 616 may include a RAN Node 604 generating and transmitting, to a UE 602, a Partial Offload Capability Indication 606, which may include a Partial Offload Capability Bitmap 608. Bits of the Partial Offload Capability Bitmap 608 may indicate whether certain offload features are supported by the RAN Node 604. The UE 602 may receive and process the Partial Offload Capability Indication 606. The enhanced RRC signaling 600 for a TCP/IP partial offload 616 may also include the UE 602 generating and transmitting, to the RAN node 604, a Partial Offload Request 610, which may include a Partial Offload Activation Request Bitmap 612. The Partial Offload Request 610 may request activation of the partial offload of one or multiple offload features that were indicated in the Partial Offload Capability Indication 606 from the RAN node 604. The RAN node 604 may receive and process the Partial Offload Request 610, and start the requested RAN-based TCP/IP partial offload 616. The enhanced RRC signaling 600 for a TCP/IP partial offload 616 may further include the RAN node 604 generating and transmitting, to the UE 602, a Partial Offload ACK message 614, which confirms that the requested RAN-based TCP/IP partial offload 616 has started.

Figure 7:
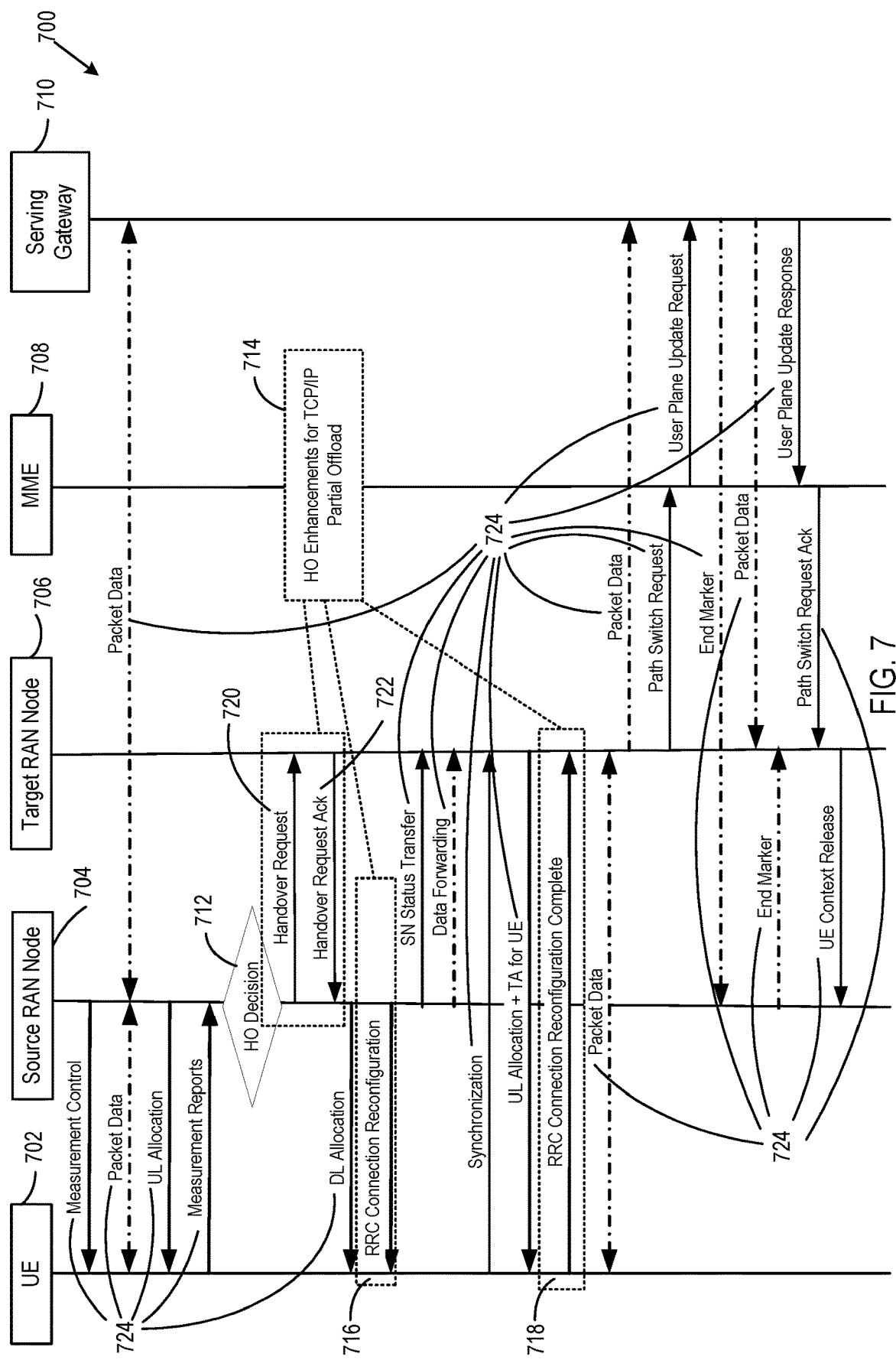
FIG. 7 is a simplified signal flow diagram illustrating signaling for a handover in accordance with some embodiments.

FIG. 7 is a simplified signal flow diagram 700 illustrating signaling for a handover in accordance with some embodiments. This discussion of FIG. 7 will focus on handover enhancements for a TCP/IP partial offload 714 (including a handoff (HO) decision 712), a handover request 720, a handover request acknowledgement (Ack) message 722, an RRC Connection Reconfiguration message 716, and an RRC Connection Reconfiguration Complete message 718). These operations and signals may be performed by a UE 702, a source RAN node 704, and a target RAN node 706 that are specifically pertinent to how partial offload may be handled during handover. FIG. 7 also illustrates an MME 708, and a serving gateway 710, although these elements are not focused on in this discussion. Also, operations and signals 724 (including measurement control message, packet data, UL allocation, measurement reports, DL allocation, SN status transfer, data forwarding, synchronization, UL allocation-TA for UE, path switch request, user plane update request, end marker, packet data, end marker, user plane update response, path switch request Ack, and UE connect release) are not discussed in detail herein.

AN HO decision 712 is made (e.g., by the source RAN node 704) to handover service of the UE 702 form the source RAN node 704 to the target RAN node 706. In some embodiments, one or more processors of the source RAN node 704 may generate a handover request 720 to be transmitted to the target RAN node 706 (e.g., eNb, gNb, etc.). The handover request 720 may be configured to request a handover of the UE 702 from the source RAN node 704 to the target RAN node 706. The target RAN node 706 may be configured to receive the handover request 720, and transmit a handover request acknowledgement (ACK) 722 to the source RAN node 704. The one or more processors of the source RAN node 704 may also be configured to decode the handover request acknowledgment message 722 received from the target RAN node 706. The one or more processors of the source RAN node 704 may also generate an RRC Connection Reconfiguration message 716 to be transmitted to the UE 702. The RRC Connection Reconfiguration message 716 may be configured to indicate that a handover is pending. The one or more processors of the source RAN node 704 may also be configured to deactivate the requested TCP/IP offload features in response to a transmission of the RRC Connection Reconfiguration message 716 to the UE 702.

The UE 702 may include a computer-readable storage medium (e.g., non-transitory) having computer readable instructions stored thereon. The computer-readable instructions are configured to instruct one or processors of the UE 702 to decode the RRC Connection Reconfiguration message 716 received from the source RAN node 704. The computer readable instructions may also be configured to instruct the one or processors to deactivate the requested TCP/IP partial offload features during the handover in response to the RRC Connection Reconfiguration message 716.

In some embodiments, the computer-readable instructions may also be configured to instruct the one or processors to generate an RRC Connection Reconfiguration Complete message 718 to indicate the UE 702 has deactivated the TCP/IP partial offload features for the handover to the Target RAN node 706. The computer-readable instructions may also be configured to instruct the one or processors to cause the RCC Connection Reconfiguration Complete message 718 to be transmitted to the target RAN node 706. The computer-readable instructions may be further configured to instruct the one or more processors to interact with the target RAN node 706 to activate partial TCP/IP offload to the target RAN node 706.

In some embodiments, the handover request 720 may be configured to indicate the requested TCP/IP offload features received from the UE 702, which are active at the source RAN node 704. One or more processors of the target RAN node 706 may decode the handover request 720 received from the source RAN node 704. The one or more processors of the target RAN node 706 may also be configured to generate a handover request Ack message 722 to be transmitted to the source RAN node 704. In such embodiments, the handover request Ack message 722 may be configured to indicate target supported TCP/IP offload features that are supported by the target RAN node 706. Also, the RRC Connection Reconfiguration message 716 may be configured to indicate the target supported partial TCP/IP offload features. The one or more processors within the target RAN node 706 may also be configured to decode the RRC Connection Reconfiguration Complete message 718 received from the UE 702. The one or more processors within the target RAN node 706 may also be configured to activate those of the supported TCP/IP features corresponding to the active partial TCP/IP offloading features of the UE 702. The one or more processors within the target RAN node 706 may also be configured to deactivate those of the active partial TCP/IP offloading features of the UE 702 that are not supported by the target RAN node 706.

In some embodiments, handover from the source RAN node 704 to the target RAN node 706 may merely include the UE 702 and the source RAN node 704 ceasing to operate according to a partial TCP/IP offload, then the UE 702 and the target RAN node 706 establishing partial TCP/IP offload following the handover.

In some embodiments, at least one of the source RAN node 704 (e.g., eNb, gNb, etc.) and the UE 702 may stop the RAN-based TCP/IP partial offload operation after the UE 702 receives the RRC Connection Reconfiguration message 716 at the beginning of the handover, and the RAN-based TCP/IP partial offload may remain inactive until the handover has concluded. After the handover, the UE 702 may exchange at least one of the Partial Offload Request 610 and the Partial Offload ACK messages 614 with the target RAN node 706 (e.g., eNb, gNb, etc.) to activate the RAN-based TCP/IP partial offload.

In some embodiments, at least one of the handover enhancements may continue RAN-based TCP/IP partial offloading with the target RAN node 706 after handover without any additional signaling. For example, the source RAN node 704 may include the UE's 702 Partial Offload Activation Request Bitmap 612 in the handover request 720. As another example, the target RAN node 706 may include its Partial Offload Capability Bitmap 608 in the handover request ACK message 722. If a partial offload feature is active at the source RAN node 704, and available at the target RAN node 706, the feature may be activated at the target RAN node 706 automatically after the handover is successful. Otherwise, the feature may be deactivated after handover. As yet another example, the source RAN node 704 may include the target RAN node's 706 Partial Offload Capability Bitmap 608 in the RRC Connection Reconfiguration message 716. In response, if a feature is not active at the source RAN node 704, but available at target RAN node 706, the UE 702 may send the Partial Offload Request 610 after handover or include the Partial Offload Activation Request Bitmap 612 in the RRC Connection Reconfiguration Complete message 718 to request the feature.

Figure 8:
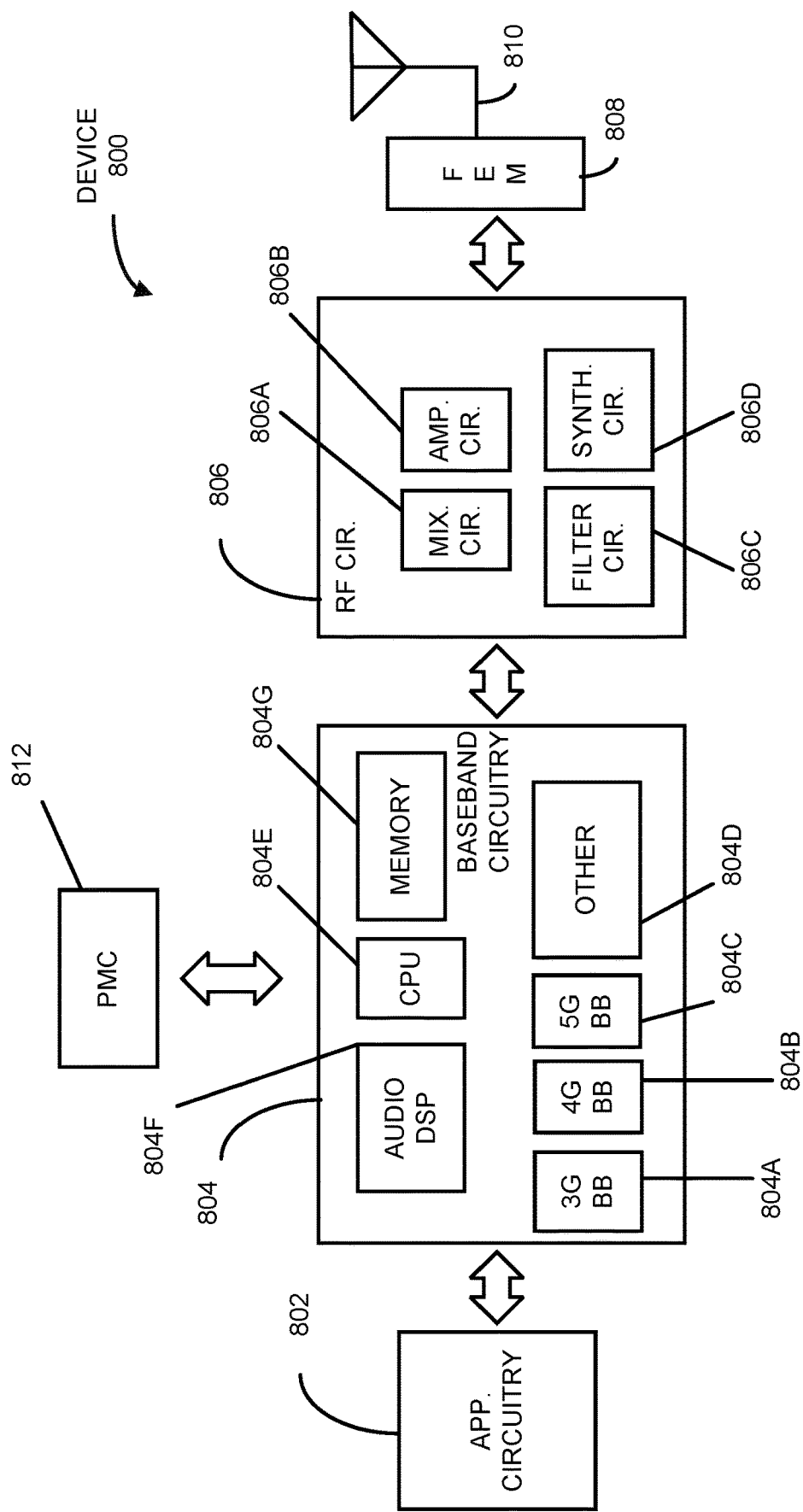
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a CPU 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU- TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806A, amplifier circuitry 806B and filter circuitry 806C. In some embodiments, the transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by the filter circuitry 806C.

In some embodiments, the mixer circuitry 806A of the receive signal path and the mixer circuitry 806A of the transmit signal path may include two or more mixers and may be arranged for quadrature downconversion and upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry 806A may be arranged for direct downconversion and direct upconversion, respectively. In some embodiments, the mixer circuitry 806A of the receive signal path and the mixer circuitry 806A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 806D of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. The FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device 800 is included in a UE. The PMC 812 may increase the power conversion efficiency while providing desirable implementation size and heat dissipation characteristics.

FIG. 8 shows the PMC 812 coupled only with the baseband circuitry 804. However, in other embodiments, the PMC 812 may be additionally or alternatively coupled with, and perform similar power management operations for, other components such as, but not limited to, the application circuitry 802, the RF circuitry 806, or the FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a PDCP layer, described in further detail below. As referred to herein, Layer 1 may comprise a PHY layer of a UE/RAN node, described in further detail below.

Figure 9:
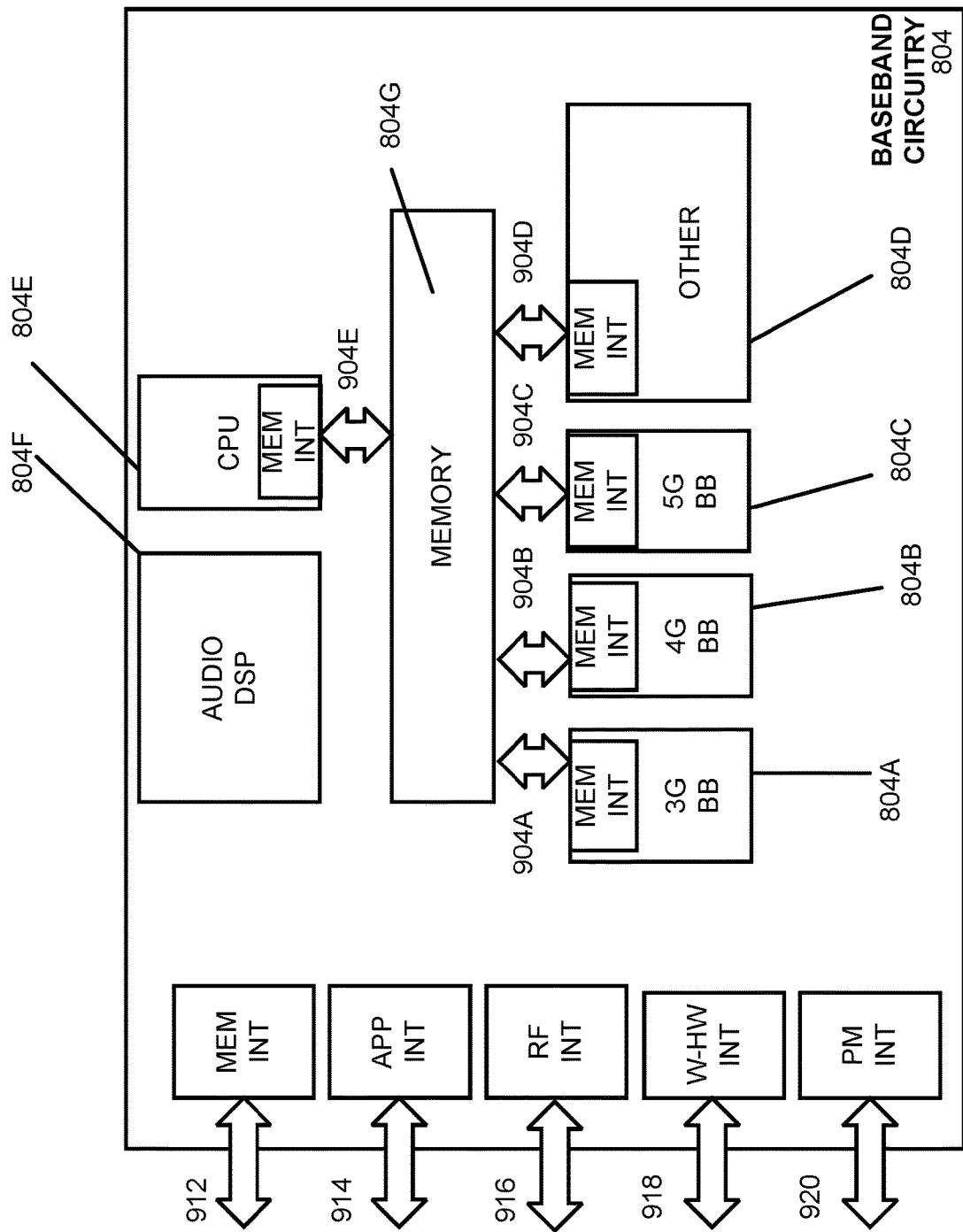
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

Figure 10:
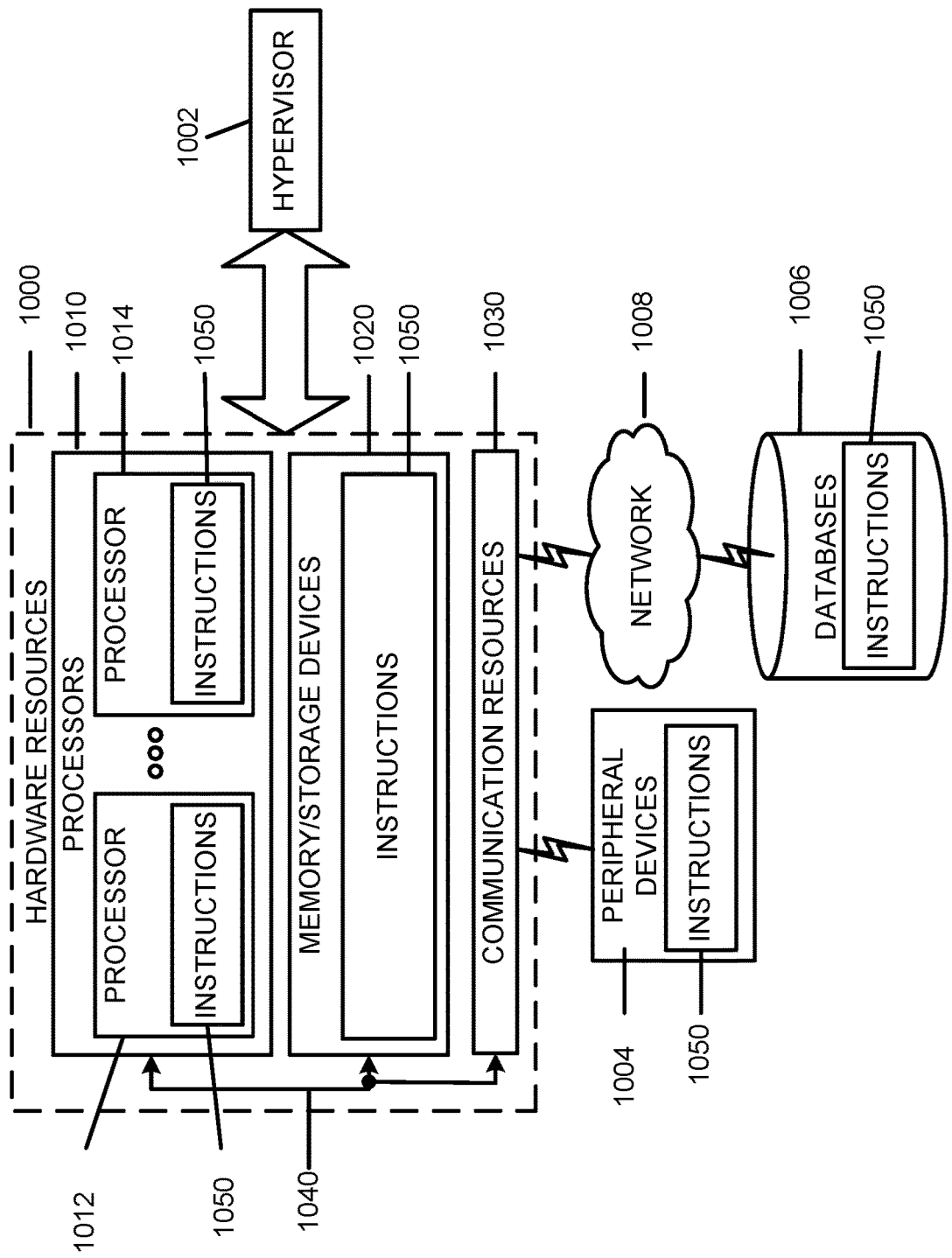
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit, a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

EXAMPLES

The following is a list of example embodiments that fall within the scope of the disclosure. In the interest of brevity and in order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1: An apparatus for a user equipment (UE), comprising: a baseband processor configured to communicate with a cellular Radio Access Network (RAN) node using a communication transceiver; and one or more processors operably coupled to the baseband processor and configured to: perform Transmission Control Protocol and Internet Protocol (TCP/IP) processing; offload only a portion of the TCP/IP processing to the cellular RAN node; and maintain TCP protocols running end-to-end between the UE and a remote host.

Example 2: The apparatus of Example 1, wherein the one or more processors comprise an application processor configured to perform and offload the TCP/IP processing.

Example 3: The apparatus according to any one of Examples 1 and 2, wherein the portion of TCP/IP processing to offload to the cellular RAN node comprises a transmit IP checksum.

Example 4: The apparatus according to any one of Examples 1-3, wherein the portion of TCP/IP processing to offload to the cellular RAN node comprises a transmit TCP checksum.

Example 5: The apparatus according to any one of Examples 1-4, wherein the portion of TCP/IP processing to offload to the cellular RAN node comprises a transmit User Datagram Protocol (UDP) checksum.

Example 6: The apparatus according to any one of Examples 1-5, wherein the portion of TCP/IP processing to offload to the cellular RAN node comprises a receive IP checksum.

Example 7: The apparatus according to any one of Examples 1-6, wherein the portion of TCP/IP processing to offload to the cellular RAN node comprises a receive TCP checksum.

Example 8: The apparatus according to any one of Examples 1-7, wherein the portion of TCP/IP processing to offload to the cellular RAN node comprises a receive User Datagram Protocol (UDP) checksum.

Example 9: The apparatus according to any one of Examples 1-8, wherein the portion of TCP/IP processing to offload to the cellular RAN node comprises a TCP transmit segmentation.

Example 10: The apparatus according to any one of Examples 1-9, wherein the portion of TCP/IP processing to offload to the cellular RAN node comprises a TCP receive concatenation.

Example 11: The apparatus according to any one of Examples 1-10, wherein the portion of TCP/IP processing to offload to the cellular RAN node comprises a TCP acknowledgement (ACK) reconstruction.

Example 12: The apparatus according to any one of Examples 1 and 3-11, wherein the one or more processors comprise an application processor, wherein the application processor is configured to offload the portion of the TCP/IP processing to the baseband processor, and the baseband processor is configured to offload at least some of the portion of the TCP/IP processing to the RAN node.

Example 13: A computer-readable storage medium of a user equipment (UE), the computer readable storage medium having computer-readable instructions stored thereon, the computer readable instructions configured to instruct one or more processors to: extract a partial Transmission Control Protocol and Internet Protocol (TCP/IP) offload capability indication from a message received from a Radio Access Network (RAN) node, the partial TCP/IP offload capability indication configured to indicate partial offload features that the RAN node supports; generate a partial offload request indicating which of the partial TCP/IP offload features indicated by the partial offload capability indication that are requested by the UE; and decode a partial offload acknowledgment (ACK) from a message received from the RAN node, the partial offload ACK configured to confirm that the requested TCP/IP partial offload features are in operation.

Example 14: The computer-readable storage medium of Example 13, wherein the message from which the partial TCP/IP offload capability indication is extracted comprises a Radio Resource Control (RRC) message.

Example 15: The computer-readable storage medium according to any one of Examples 13 and 14, wherein the partial offload features that the RAN node supports comprise one or more partial offload features selected from the group consisting of a transmit IP checksum, a transmit TCP checksum, a transmit User Datagram Protocol (UDP) checksum, a receive IP checksum, a receive TCP checksum, a receive UDP checksum, a TCP transmit segmentation, a TCP receive concatenation, and a TCP acknowledgement (ACK) reconstruction.

Example 16: The computer-readable storage medium according to any one of Examples 13-15, wherein the computer readable instructions are configured to: instruct the one or more processors to decode a Radio Resource Control (RRC) Connection Reconfiguration message received from the RAN node at an initiation of a handover from the RAN node to another RAN node; and deactivate the requested TCP/IP partial offload features during the handover responsive to the RRC Connection Reconfiguration message.

Example 17: The computer-readable storage medium of Example 16, wherein the computer readable instructions are configured to instruct the one or more processors to: generate a Radio Resource Control (RRC) Connection Reconfiguration Complete message configured to indicate that the UE has deactivated the partial offload features for the handover to the another RAN node; cause the RRC Connection Reconfiguration Complete message to be transmitted to the another RAN node; and interact with the another RAN node to activate partial TCP/IP offload to the another RAN node.

Example 18: The computer-readable storage medium according to any one of Examples 13-15, wherein the computer readable instructions are further configured to instruct the one or more processors to partially offload TCP/IP functions to another RAN node after a handoff from the RAN node to the another RAN node without receiving a TCP/IP offload functionality indication from the another RAN node.

Example 19: An apparatus of a cellular base station, comprising: a data storage device configured to store data indicating supported partial Transmission Control Protocol and Internet Protocol (TCP/IP) offload features that are supported by the cellular base station to enable partial offloading of TCP/IP processing from a User Equipment (UE); and one or more processors operably coupled to the data storage device and configured to: generate a message to be transmitted to the UE, the message configured to indicate the supported partial TCP/IP offload features; decode a partial TCP/IP offload request received from the UE, the partial TCP/IP offload request configured to indicate requested TCP/IP offload features of the supported partial TCP/IP offload features that the UE requests to activate; activate the requested TCP/IP offload features; and generate an acknowledgement (ACK) message to be transmitted to the UE, the ACK message configured to confirm that the requested TCP/IP offload features are activated.

Example 20: The apparatus of Example 19, wherein the one or more processors are configured to: generate a handover request to be transmitted to a target cellular base station that is separate from the cellular base station, the handover request configured to request a handover of the UE from the cellular base station to the target cellular base station; decode a handover request acknowledgment received from the target cellular base station; generate a Radio Resource Control (RRC) Connection Reconfiguration message to be transmitted to the UE, the RRC Connection Reconfiguration message indicating that a handover is triggered; and deactivate the requested TCP/IP offload features responsive to a transmission of the RRC Connection Reconfiguration message to the UE.

Example 21: The apparatus of Example 19, wherein the one or more processors are configured to: generate a handover request to be transmitted to a target cellular base station that is separate from the cellular base station, the handover request configured to indicate the requested TCP/IP offload features received from the UE; decode a handover request acknowledgement message received from the target cellular base station, the handover request acknowledgement message configured to indicate partial TCP/IP offload features that are supported by the target cellular base station; generate a Radio Resource Control (RRC) Connection Reconfiguration message to be transmitted to the UE, the RRC Connection Reconfiguration message configured to indicate the partial TCP/IP offload features that are supported by the target cellular base station; and perform a handover of the UE to the target cellular base station.

Example 22: The apparatus of Example 19, wherein the one or more processors are configured to: decode a handover request received from a source cellular base station, the handover request configured to request a handover of another UE to the cellular base station; generate a handover request acknowledgement message to be transmitted to the source cellular base station; decode a Radio Resource Control (RRC) Connection Reconfiguration Complete message received from the another UE; and generate a message to be transmitted to the another UE, the message configured to indicate the supported partial TCP/IP offload features.

Example 23: The apparatus of Example 19, wherein the one or more processors are configured to: decode a handover request received from a source cellular base station, the handover request configured to request a handover of another UE to the cellular base station and indicate active partial TCP/IP offloading features of the another UE; generate a handover request acknowledgement message to be transmitted to the source cellular base station, the handover request acknowledgement message configured to indicate the supported TCP/IP features; decode a Radio Resource Control (RRC) Reconfiguration Complete message received from the another UE; activate those of the supported TCP/IP features that correspond to the active partial TCP/IP offloading features of the another UE; and deactivate those of the active partial TCP/IP offloading features of the another UE that are not supported by the cellular base station.

Example 24: The apparatus of Example 23, wherein: the RRC Connection Reconfiguration Complete message is configured to indicate one or more partial TCP/IP offload features that were not supported by the source cellular base station, but that are supported by the target cellular base station; and the one or more processors are configured to activate the one or more of the partial TCP/IP offload features indicated by the RRC Connection Reconfiguration Complete message.

Example 25: A method of operating a user equipment (UE), the method comprising: performing Transmission Control Protocol and Internet Protocol (TCP/IP) processing; offloading only a portion of the TCP/IP processing to a cellular RAN node; and maintaining TCP protocols running end-to-end between the UE and a remote host.

Example 26: The method of Example 25, performing TCP/IP processing includes performing the TCP/IP processing using an application processor.

Example 27: The method according to any one of Examples 25 and 26, wherein offloading only a portion of the TCP/IP processing to a cellular RAN node comprises offloading a transmit IP checksum to the cellular RAN node.

Example 28: The method according to any one of Examples 25-27, wherein offloading only a portion of the TCP/IP processing to a cellular RAN node comprises offloading a transmit TCP checksum to the cellular RAN node.

Example 29: The method according to any one of Examples 25-28, wherein offloading only a portion of the TCP/IP processing to a cellular RAN node comprises offloading a transmit User Datagram Protocol (UDP) checksum to the cellular RAN node.

Example 30: The method according to any one of Examples 25-29, wherein offloading only a portion of the TCP/IP processing to a cellular RAN node comprises offloading a receive IP checksum to the cellular RAN node.

Example 31: The method according to any one of Examples 25-30, wherein offloading only a portion of the TCP/IP processing to a cellular RAN node comprises offloading a receive TCP checksum to the cellular RAN node.

Example 32: The method according to any one of Examples 25-31, wherein offloading only a portion of the TCP/IP processing to a cellular RAN node comprises offloading a receive User Datagram Protocol (UDP) checksum to the cellular RAN node.

Example 33: The method according to any one of Examples 25-32, wherein offloading only a portion of the TCP/IP processing to a cellular RAN node comprises offloading a TCP transmit segmentation to the cellular RAN node.

Example 34: The method according to any one of Examples 25-33, wherein offloading only a portion of the TCP/IP processing to a cellular RAN node comprises offloading a TCP receive concatenation to the cellular RAN node.

Example 35: The method according to any one of Examples 25-34, wherein offloading only a portion of the TCP/IP processing to a cellular RAN node comprises offloading a TCP acknowledgement (ACK) reconstruction to the cellular RAN node.

Example 36: The method according to any one of Examples 25 and 27-35, wherein offloading only a portion of the TCP/IP processing to a cellular RAN node comprises offloading, form an application processor, the portion of the TCP/IP processing to a baseband processor, and offloading at least some of the portion of the TCP/IP processing to the RAN node from the baseband processor.

Example 37: A method of operating a user equipment (UE), the method comprising: extracting a partial Transmission Control Protocol and Internet Protocol (TCP/IP) offload capability indication from a message received from a Radio Access Network (RAN) node, the partial TCP/IP offload capability indication configured to indicate partial offload features that the RAN node supports; generating a partial offload request indicating which of the partial TCP/IP offload features indicated by the partial offload capability indication that are requested by the UE; and decoding a partial offload acknowledgment (ACK) from a message received from the RAN node, the partial offload ACK configured to confirm that the requested TCP/IP partial offload features are in operation.

Example 38: The method of Example 37, wherein extracting a partial TCP/IP offload capability indication from a message received from a RAN node comprises extracting the partial TCP/IP offload capability indication from a Radio Resource Control (RRC) message.

Example 39: The method according to any one of Examples 37 and 38, wherein the partial offload features that the RAN node supports comprise one or more partial offload features selected from the group consisting of a transmit IP checksum, a transmit TCP checksum, a transmit User Datagram Protocol (UDP) checksum, a receive IP checksum, a receive TCP checksum, a receive UDP checksum, a TCP transmit segmentation, a TCP receive concatenation, and a TCP acknowledgement (ACK) reconstruction.

Example 40: The method according to any one of Examples 37-39, further comprising: decoding a Radio Resource Control (RRC) Connection Reconfiguration message received from the RAN node at an initiation of a handover from the RAN node to another RAN node; and deactivating the requested TCP/IP partial offload features during the handover responsive to the RRC Connection Reconfiguration message.

Example 41: The method of Example 40, further comprising: generating a Radio Resource Control (RRC) Connection Reconfiguration Complete message configured to indicate that the UE has deactivated the partial offload features for the handover to the another RAN node; transmitting the RRC Connection Reconfiguration Complete message to the another RAN node; and interacting with the another RAN node to activate partial TCP/IP offload to the another RAN node.

Example 42: The method according to any one of Examples 37-39, wherein partially offloading TCP/IP functions to another RAN node comprises partially offloading the TCP/IP functions to the another RAN node after a handoff from the RAN node to the another RAN node without receiving a TCP/IP offload functionality indication from the another RAN node.

Example 43: A method of operating a cellular base station, the method comprising: storing data indicating supported partial Transmission Control Protocol and Internet Protocol (TCP/IP) offload features that are supported by the cellular base station to enable partial offloading of TCP/IP processing from a User Equipment (UE); transmitting a message to the UE, the message configured to indicate the supported partial TCP/IP offload features; receiving a partial TCP/IP offload request from the UE, the partial TCP/IP offload request configured to indicate requested TCP/IP offload features of the supported partial TCP/IP offload features that the UE requests to activate; activating the requested TCP/IP offload features; and transmitting an acknowledgement (ACK) message to the UE, the ACK message configured to confirm that the requested TCP/IP offload features are activated.

Example 44: The method of Example 43, further comprising: transmitting a handover request to a target cellular base station that is separate from the cellular base station, the handover request configured to request a handover of the UE from the cellular base station to the target cellular base station; receive a handover request acknowledgment from the target cellular base station; transmitting a Radio Resource Control (RRC) Connection Reconfiguration message to the UE, the RRC Connection Reconfiguration message indicating that a handover is triggered; and deactivating the requested TCP/IP offload features responsive to a transmission of the RRC Connection Reconfiguration message to the UE.

Example 45: The method of Example 43, further comprising: transmitting a handover request to a target cellular base station that is separate from the cellular base station, the handover request configured to indicate the requested TCP/IP offload features received from the UE; receiving a handover request acknowledgement message from the target cellular base station, the handover request acknowledgement message configured to indicate partial TCP/IP offload features that are supported by the target cellular base station; transmitting a Radio Resource Control (RRC) Connection Reconfiguration message to the UE, the RRC Connection Reconfiguration message configured to indicate the partial TCP/IP offload features that are supported by the target cellular base station; and performing a handover of the UE to the target cellular base station.

Example 46: The method of Example 43, further comprising: receiving a handover request from a source cellular base station, the handover request configured to request a handover of another UE to the cellular base station; transmitting a handover request acknowledgement message to the source cellular base station; receiving a Radio Resource Control (RRC) Connection Reconfiguration Complete message from the another UE; and transmitting a message to the another UE, the message configured to indicate the supported partial TCP/IP offload features.

Example 47: The method of Example 43, further comprising: receiving a handover request from a source cellular base station, the handover request configured to request a handover of another UE to the cellular base station and indicate active partial TCP/IP offloading features of the another UE; transmitting a handover request acknowledgement message to the source cellular base station, the handover request acknowledgement message configured to indicate the supported TCP/IP features; receiving a Radio Resource Control (RRC) Reconfiguration Complete message from the another UE; activating those of the supported TCP/IP features that correspond to the active partial TCP/IP offloading features of the another UE; and deactivating those of the active partial TCP/IP offloading features of the another UE that are not supported by the cellular base station.

Example 48: The method of Example 47, wherein the RRC Connection Reconfiguration Complete message is configured to indicate one or more partial TCP/IP offload features that were not supported by the source cellular base station, but that are supported by the target cellular base station, the method further comprising activating the one or more of the partial TCP/IP offload features indicated by the RRC Connection Reconfiguration Complete message.

Example 49: A computer-readable storage medium having computer-readable instructions stored thereon, the computer readable instructions configured to instruct one or more processors to perform at least a portion of the method according to any one of Examples 25-48.

Example 50: A means for performing at least a portion of the method according to any one of Examples 25-48.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure, as contemplated by the inventors.

The invention claimed is:

1. A non-transitory computer-readable storage medium of a user equipment (UE), the computer-readable storage medium having computer-readable instructions stored thereon, the computer-readable instructions configured to instruct one or more processors to:
   extract a partial Transmission Control Protocol and Internet Protocol (TCP/IP) offload capability indication from a message received from a Radio Access Network (RAN) node, the partial TCP/IP offload capability indication configured to indicate, using a bitmap, partial TCP/IP offload features that the RAN node supports;
   generate a partial offload request indicating requested TCP/IP partial offload features of the partial TCP/IP offload features indicated by the partial TCP/IP offload capability indication that are requested by the UE; and
   decode a partial offload acknowledgment (ACK) received from the RAN node, the partial offload ACK configured to confirm that the requested TCP/IP partial offload features are in operation.

2. The non-transitory computer-readable storage medium of claim 1, wherein the message from which the partial TCP/IP offload capability indication is extracted comprises a Radio Resource Control (RRC) message.

3. The non-transitory computer-readable storage medium of claim 1, wherein the partial TCP/IP offload features that the RAN node supports are selected from a group comprising a transmit IP checksum, a transmit TCP checksum, a transmit User Datagram Protocol (UDP) checksum, a receive IP checksum, a receive TCP checksum, a receive UDP checksum, a TCP transmit segmentation, a TCP receive concatenation, and a TCP acknowledgement (ACK) reconstruction.

4. The non-transitory computer-readable storage medium of claim 1, wherein the computer-readable instructions are configured to:
   instruct the one or more processors to decode a Radio Resource Control (RRC) Connection Reconfiguration message received from the RAN node at an initiation of a handover from the RAN node to another RAN node; and
   deactivate the requested TCP/IP partial offload features during the handover responsive to the RRC Connection Reconfiguration message.

5. The non-transitory computer-readable storage medium of claim 4, wherein the computer-readable instructions are configured to instruct the one or more processors to:
   generate an RRC Connection Reconfiguration Complete message configured to indicate that the UE has deactivated the partial TCP/IP offload features for the handover to the another RAN node;
   cause the RRC Connection Reconfiguration Complete message to be transmitted to the another RAN node; and
   interact with the another RAN node to activate partial TCP/IP offload to the another RAN node.

6. The non-transitory computer-readable storage medium of claim 1, wherein the computer-readable instructions are further configured to instruct the one or more processors to partially offload TCP/IP functions to another RAN node after a handoff from the RAN node to the another RAN node without receiving a TCP/IP offload functionality indication from the another RAN node.

7. A user equipment (UE), comprising:
   a memory device; and
   one or more processors in communication with the memory device, the one or more processors configured to:
   extract a partial Transmission Control Protocol and Internet Protocol (TCP/IP) offload capability indication from a message received from a Radio Access Network (RAN) node, the partial TCP/IP offload capability indication configured to indicate, using a bitmap partial TCP/IP offload features that the RAN node supports;
   generate a partial offload request indicating requested TCP/IP partial offload features of the partial TCP/IP offload features indicated by the partial TCP/IP offload capability indication that are requested by the UE; and
   decode a partial offload acknowledgment (ACK) received from the RAN node, the partial offload ACK configured to confirm that the requested TCP/IP partial offload features are in operation.

8. The UE of claim 7, wherein the message from which the partial TCP/IP offload capability indication is extracted comprises a Radio Resource Control (RRC) message.

9. The UE of claim 7, wherein the partial TCP/IP offload features that the RAN node supports are selected from a group comprising a transmit IP checksum, a transmit TCP checksum, a transmit User Datagram Protocol (UDP) checksum, a receive IP checksum, a receive TCP checksum, a receive UDP checksum, a TCP transmit segmentation, a TCP receive concatenation, and a TCP acknowledgement (ACK) reconstruction.

10. The UE of claim 7, wherein the one or more processors are further configured to:
decode a Radio Resource Control (RRC) Connection Reconfiguration message received from the RAN node at an initiation of a handover from the RAN node to another RAN node; and
deactivate the requested TCP/IP partial offload features during the handover responsive to the RRC Connection Reconfiguration message.

11. The UE of claim 10, wherein the one or more processors are further configured to:
generate an RRC Connection Reconfiguration Complete message configured to indicate that the UE has deactivated the partial TCP/IP offload features for the handover to the another RAN node;
cause the RRC Connection Reconfiguration Complete message to be transmitted to the another RAN node; and
interact with the another RAN node to activate partial TCP/IP offload to the another RAN node.

12. The UE of claim 7, wherein the one or more processors are further configured to partially offload TCP/IP functions to another RAN node after a handoff from the RAN node to the another RAN node without receiving a TCP/IP offload functionality indication from the another RAN node.

13. A method for a user equipment (UE), the method comprising:
extracting a partial Transmission Control Protocol and Internet Protocol (TCP/IP) offload capability indication from a message received from a Radio Access Network (RAN) node, the partial TCP/IP offload capability indication configured to indicate, using a bitmap, partial TCP/IP offload features that the RAN node supports;
generating a partial offload request indicating requested TCP/IP partial offload features of the partial TCP/IP offload features indicated by the partial TCP/IP offload capability indication that are requested by the UE; and
decoding a partial offload acknowledgment (ACK) received from the RAN node, the partial offload ACK configured to confirm that the requested TCP/IP partial offload features are in operation.

14. The method of claim 13, wherein the message from which the partial TCP/IP offload capability indication is extracted comprises a Radio Resource Control (RRC) message.

15. The method of claim 13, wherein the partial TCP/IP offload features that the RAN node supports are selected from a group comprising a transmit IP checksum, a transmit TCP checksum, a transmit User Datagram Protocol (UDP) checksum, a receive IP checksum, a receive TCP checksum, a receive UDP checksum, a TCP transmit segmentation, a TCP receive concatenation, and a TCP acknowledgement (ACK) reconstruction.

16. The method of claim 13, further comprising:
decoding a Radio Resource Control (RRC) Connection Reconfiguration message received from the RAN node at an initiation of a handover from the RAN node to another RAN node; and
deactivating the requested TCP/IP partial offload features during the handover responsive to the RRC Connection Reconfiguration message.

17. The method of claim 16, further comprising:
generating an RRC Connection Reconfiguration Complete message configured to indicate that the UE has deactivated the partial TCP/IP offload features for the handover to the another RAN node;
transmitting the RRC Connection Reconfiguration Complete message to the another RAN node; and
interacting with the another RAN node to activate partial TCP/IP offload to the another RAN node.

18. The method of claim 13, further comprising partially offloading TCP/IP functions to another RAN node after a handoff from the RAN node to the another RAN node without receiving a TCP/IP offload functionality indication from the another RAN node.

* * * * *